United States Patent [19]

Nagano

[11] Patent Number: 5,209,581

[45] Date of Patent: May 11, 1993

[54] CRANK ARM MOUNTING APPARATUS FOR A BICYCLE

[75] Inventor: Masashi Nagano, Izumi, Japan

[73] Assignee: Shimano, Inc., Osaka, Japan

[21] Appl. No.: 789,973

[22] Filed: Nov. 12, 1991

[30] Foreign Application Priority Data

Nov. 14, 1990 [JP] Japan .............................. 2-119543[U]

[51] Int. Cl.5 .............................................. B62K 19/34
[52] U.S. Cl. ................................... 384/545; 74/594.2; 384/431; 384/540
[58] Field of Search ........................... 74/594.1, 594.2; 384/514, 512, 540, 545, 510, 431

[56] References Cited

U.S. PATENT DOCUMENTS

| 4,545,691 | 10/1985 | Kastan et al. | 384/540 |
| 4,738,551 | 4/1988 | Chi | 384/540 |
| 5,106,210 | 4/1992 | Chi | 384/510 |

FOREIGN PATENT DOCUMENTS

| 564049 | 10/1923 | France . | |
| 623094 | 3/1927 | France . | |
| 54-102848 | 12/1952 | Japan . | |
| 1-180393 | 12/1989 | Japan . | |
| 2-17491 | 2/1990 | Japan . | |
| 2166810 | 5/1986 | United Kingdom | 384/431 |

Primary Examiner—Mitchell J. Hill
Attorney, Agent, or Firm—Dickstein, Shapiro & Morin

[57] ABSTRACT

A crank shaft unit for rotatably mounting bicycle crank arms in a bottom bracket includes, and adapters for maintaining the crank shaft unit in position relative to the bottom bracket. The crank shaft unit includes a crank shaft having connecting projections formed at opposite ends thereof for engaging inside walls of bosses of the crank arms, a cylindrical member surrounding the crank shaft, and bearings for rotatably supporting the crank shaft in inside walls of the cylindrical member. The adapters are mounted between an inside wall of the bottom bracket and the crank shaft unit. At least part of the bosses of the crank arms extend into annular spaces formed between inside walls of the adapter means and the crank shaft. Annular stepped spaces extend from the ambient to surfaces of the crank shaft through the adapters and bosses.

11 Claims, 3 Drawing Sheets

CRANK ARM MOUNTING APPARATUS FOR A BICYCLE

BACKGROUND OF THE INVENTION

1. Field of the Invention

The present invention relates to an apparatus for rotatably mounting a crank arm in a bottom bracket of a bicycle.

2. Description of the Related Art

A conventional apparatus of this type is known from Japanese Utility Model Publication Kokai No. 1949-102848. This apparatus employs a cylindrical bracket acting as outer races for ball bearings for mounting in a bottom bracket a crank shaft connected to crank arms. According to this structure, spaces in the form of flat rings are defined between end faces of the cylindrical bracket and end faces of bosses of the crank arms. Mud and the like entering through these spaces tend to reach the crank shaft. The crank shaft is a rotary element, and may be worn or deprived of smooth rotation by the intruding mud and the like. Further, wear resulting from the contact between the cylindrical bracket and bearing balls becomes a direct cause of a displacement between the bottom bracket and crank shaft.

Another such apparatus is known from Japanese Utility Model Publication Kokai No. 1989-180393. This apparatus includes a crank shaft unit having a crank shaft connected to bosses of crank arms, a cylindrical element surrounding the crank shaft, and ball bearings provided on inside walls of the cylindrical element for rotatably supporting the crank shaft, the crank shaft unit being mounted in place through adapters. In this structure also, spaces in the form of flat rings are defined between end faces of the crank shaft unit and end faces of the bosses of the crank arms, and intruding dust and mud tend to reach surfaces of the crank shaft to cause wear or impair smooth rotation.

SUMMARY OF THE INVENTION

The object of the present invention is to provide a bicycle crank arm mounting apparatus having a structure for allowing a crank shaft unit to be mounted in a bottom bracket correctly and reliably while protecting a crank shaft from mud and the like.

The above object is fulfilled, according to the present invention, by an apparatus comprising a crank shaft unit including a crank shaft connected to bosses of crank arms, a cylindrical member surrounding the crank shaft, and bearings for rotatably supporting the crank shaft in inside walls of the cylindrical member; and adapters for maintaining the crank shaft unit in position relative to the bottom bracket; wherein at least part of the bosses of the crank arms extend into annular spaces formed between inside walls of the adapters and the crank shaft.

For attaching the crank arms to the bottom bracket by using the above apparatus, the adapters are mounted on the cylindrical member of the crank shaft unit, and then the adapters are fitted in the bottom bracket. The crank arms are fixed to the crank shaft, with bores formed in the bosses at proximal ends of the crank arms fitted on connecting projections formed at opposite ends of the crank shaft. When assembled, at least part of the bosses of the crank arms extend into annular spaces formed between inside walls of the adapters and the crank shaft. Consequently, spaces extending from the ambient to surfaces of the crank shaft become stepped ring-like spaces which do no allow easy access of mud and the like to the crank shaft surfaces. Since entry of mud, dust and the like is checked, the rotary components are protected from wear and erratic rotation. This construction also allows the bosses of the crank arms and connecting projections opposed thereto to have increased lengths. This results in enlarged areas of engagement to realize connections between the crank shaft and crank arms having increased strength. Conversely, where the areas of engagement need not be enlarged, the crank shaft may have a reduced length.

Other features and advantages of the present invention will be apparent from the dependent claims and the description of the preferred embodiments to be had with reference to the drawings.

DETAILED DESCRIPTION OF THE PREFERRED EMBODIMENTS

Figure 1:
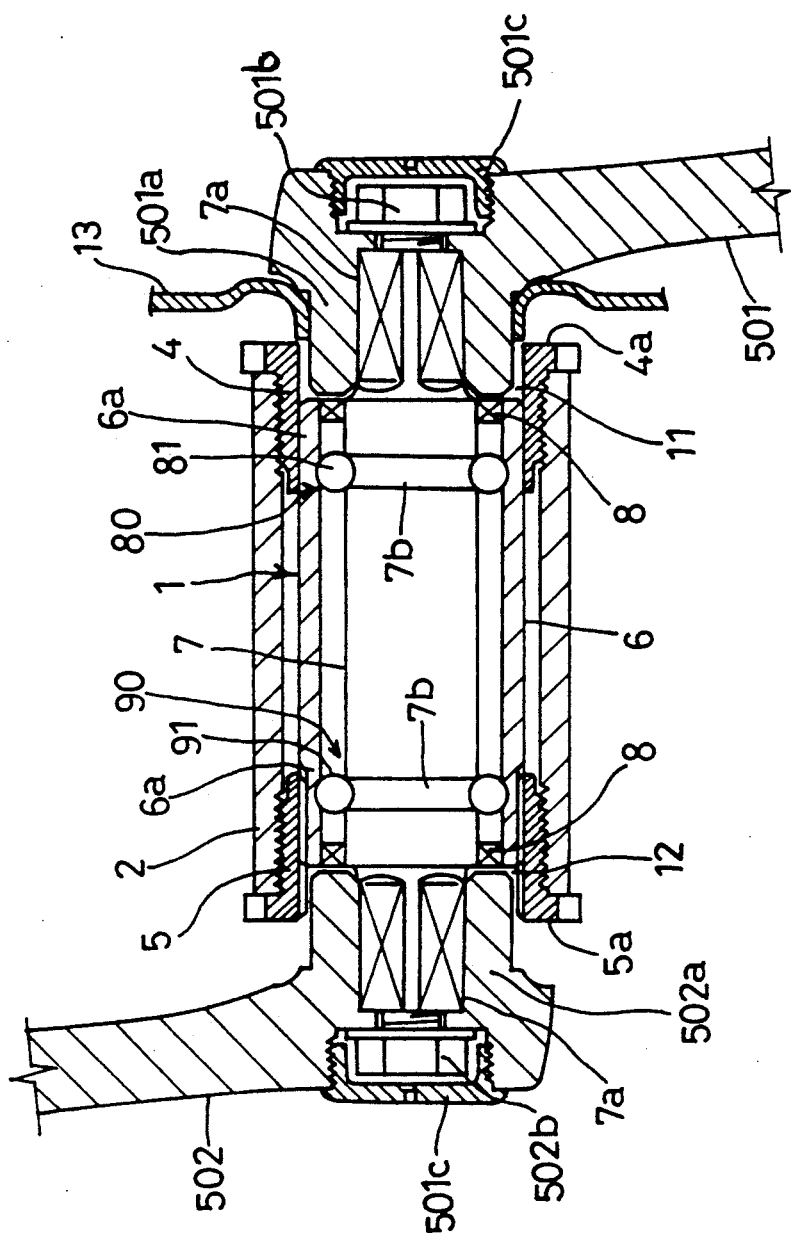
FIG. 1 is a sectional view showing a bicycle crank arm mounting apparatus in a first embodiment of the present invention.
Figure 2:
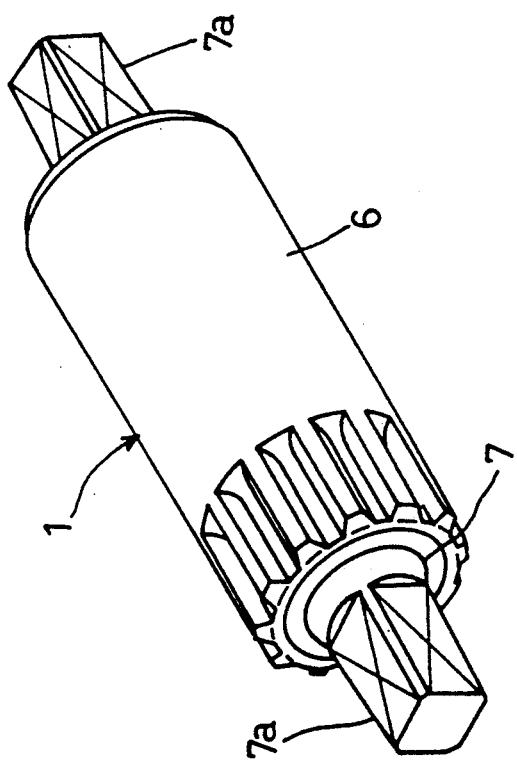
FIG. 2 is a perspective view of a crank shaft unit of the mounting apparatus shown in FIG. 1.

FIG. 1 is a sectional view showing a bicycle crank arm mounting apparatus in a first embodiment of the present invention. This apparatus includes a crank shaft unit 1 mounted in a cylindrical bottom bracket 2 through a cylindrical right adapter 4 and a cylindrical left adapter 5. These adapters 4 and 5 are fitted in annular spaces defined between opposite ends of the bottom bracket 2 and the crank shaft unit As shown in FIG. 2, the crank shaft unit 1 includes a crank shaft 7 having connecting projections 7a at opposite ends thereof fixedly engaging inside walls of bosses 501a and 502a of crank arms 501 and 502, a cylindrical member 6 surrounding the crank shaft 7, and a bearing device for rotatably supporting the crank shaft 7 on inside walls of the cylindrical member 6. The bearing device includes a first bearing unit 80 and a second bearing unit 90 spaced from each other axially of the crank shaft 7. In this embodiment, each of the bearing units 80 and 90 includes an annular groove 7b formed peripherally of the crank shaft 7 to act as an inner race, an annular groove 6a formed in the cylindrical member 6 to act as an outer race, and balls 81 or 91 acting as rolling elements arranged between these grooves 7b and 6a. Seals 8 are provided outwardly of the two bearing units 80 and 90. The crank shaft unit 1 is assembled in advance, and may simply be mounted in the bottom bracket 2 to secure what are desirable as the bearing structure for the crank shaft 7 and relationship of the cylindrical member 6 to the crank shaft 7.

Various types of structure are conceivable for limiting axial movement of the crank shaft unit 1 relative to the bottom bracket 2. As shown in FIG. 1, for example, the adapters 4 and 5 may be screwed tight to the bottom bracket 2. For this purpose, screws are formed on inside walls in end regions of the bottom bracket 2 and on outer peripheral walls of the adapters 4 and 5. Further, to limit a screwing extent of the adapters 4 and 5, flanges 104a and 105a are formed on outward ends of the adapters 4 and 5 for abutting on faces of the bottom bracket 2.

As regards coupling between the crank shaft unit 1 and adapters 4 and 5, the right adapter 4 has an inside wall fitting on a corresponding outside wall of the cylindrical member 6 of the crank shaft unit 1, and the left adapter 5 has an inside wall splined to a corresponding outside wall of the cylindrical member 6. The left adapter 5 is securely coupled to the cylindrical member 6, compared with the two walls joined by a screw engagement, in that axial displacement is limited by the screws while a circumferential displacement is limited by the splines.

The bosses 501a and 502a of the crank arms 501 and 502 into which the connecting extensions 7a of the crank shaft 7 are inserted are countersunk to receive flanged bolts 501b and 502b screwed into threaded axial holes formed in end surfaces of the crank shaft 7. The crank arms 501 and 502 and crank shaft 7 are securely fixed together by tightening the flanged bolts 501b and 502b. The countersinks are covered by caps 501c. A gear wheel 13 is mounted on the boss 501a of the right crank arm 501. The bosses 501a and 502a of the crank arms 501 and 502 projecting toward the crank shaft unit 1 are inserted into annular spaces 11 and 12 between the adapters 4 and 5 and crank shaft unit 1 to positions close to the ends of the cylindrical member 6. Thus, the cylindrical member 6 has a smaller length than in the prior art. According to this construction, the spaces extending from the ambient to surfaces of the crank shaft 7 are in a stepped annular form. Therefore, not only is the crank shaft 7 completely invisible from outside, but entry of dust, mud and the like is effectively checked. Where, for reasons of construction, such a shape of passage space is required only at one side, one of the bosses may be inserted inwardly of the outer end surface of one adapter, with the other boss disposed adjacent the outer end surface of the other adapter.

A second embodiment of the present invention will be described next with reference to FIG. 3. The second embodiment differs from the first embodiment in the bearing device. In addition, a left adapter 105 in the second embodiment is inserted between the inside wall of a cylindrical member 106 and a crank shaft 107, while a right adapter 104 is inserted between the inside wall of the bottom bracket 2 and the outside wall of the cylindrical member 106 as in the first embodiment.

The bearing device in this embodiment also include a right bearing unit 180 and a left bearing unit 190 spaced from each other axially of the crank shaft 107. The right bearing unit 180 includes an inner race 107b projecting from the crank shaft 107, a stepped outer race 106a formed on the cylindrical member 106 of the crank shaft unit 101, and balls 181 acting as rolling elements mounted between the inner and outer races 107b and 106a. The left bearing unit 190 includes an inner race element 192 meshed with a screw 107c formed on the crank shaft 107, a stepped outer race 106b formed in the cylindrical member 106, balls 191 acting as rolling elements mounted between the inner race element 192 and outer race 106b, and a lock nut 193 for limiting axial movement of the inner race element 192. The cylindrical member 106 further includes an inspection and maintenance bore 106c for allowing positional adjustment of the inner race element 192. By adjusting position of the inner race element 192 in the axial direction, the pressure applied to the bearing balls 181 and 191 is adjusted.

As in the first embodiment, the right adapter 104 has an inside wall fitting on a corresponding outside wall of the cylindrical member 106 of the crank shaft unit 1011, and the left adapter 105 has an outside wall screwed to an inside wall of the bottom bracket 2. The left adapter 105 has the outside wall splined to an inside wall of the cylindrical member 106. The cylindrical member 106 has an outside wall screwed to the inside wall of the bottom bracket 2. A seal 108 is placed in contact with the inside wall of the left adapter 105. The right and left adapters 104 and 105 include flanges 104a and 105a, respectively.

For inserting and fixing the crank shaft unit 101 inside the bottom bracket 2, the left adapter 105 is first spline-connected to the left end of the cylindrical member 106, and thereafter the cylindrical member 106 is screwed to the bottom bracket 2, using the screw formed on the outer wall of the cylindrical member 106. Next, the right adapter 104 is press fit and screwed onto the right end of the cylindrical member 106.

The crank arms 501 and 502 are joined to connecting projections 107a of the crank shaft 107 substantially in the same way as in the first embodiment. In this embodiment also, the bosses 501a and 502a of the crank arms 501 and 502 projecting toward the crank shaft unit 1 are inserted into annular spaces 111 and 112 formed between the adapters 104 and 105 and crank shaft 107. As in the first embodiment, the spaces extending from the ambient to surfaces of the crank shaft 107 are in a stepped annular form. Therefore, not only is the crank shaft 107 completely invisible from outside, but entry of dust, mud and the like is effectively checked. Reference numerals 501b and 502b denote flanged bolts screwed into threaded axial holes formed in end surfaces of the crank shaft 107. Numerals 501c and 502c denote caps.

Crank arm mounting apparatus according to the present invention may be in various other forms than the two embodiments described above. Some examples will be described hereinafter.

Figure 3:
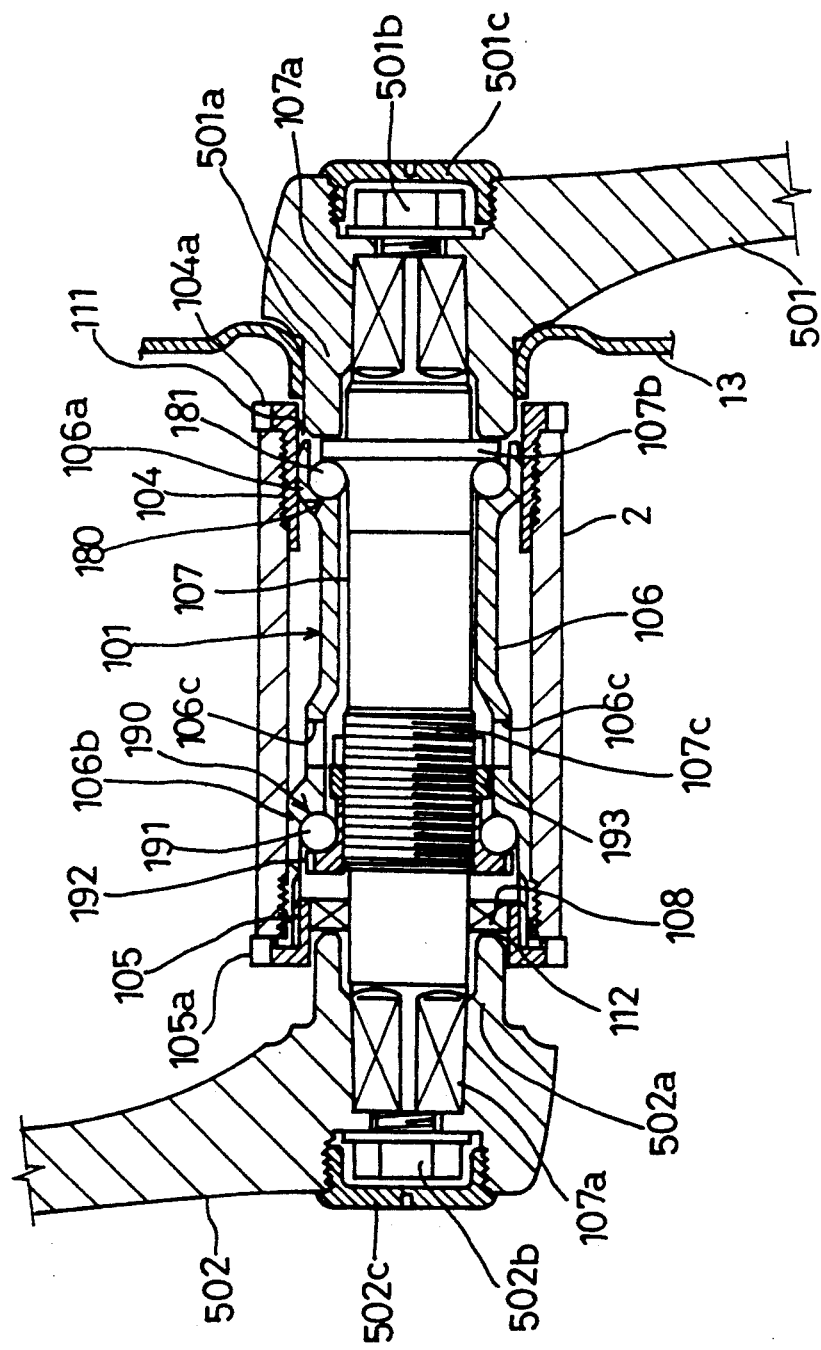
FIG. 3 is a sectional view showing a bicycle crank arm mounting apparatus in a second embodiment of the present invention.

(1) The bosses 501a and 502a of the crank arms need not be form a right angle or larger angle with the arms as shown in FIGS. 1 and 3, but may just be inclined toward the crank shaft unit, with opposite inside surfaces of the adapters formed parallel to the inclined surfaces of the bosses. This construction will also produce the effect of preventing entry of dust, mud and the like.

(2) In the foregoing embodiments, movement of the crank shaft units 1 and 101 axially of the bottom brackets 2 is limited by the flanges 10 and 110 of the adapters 4, 5, 104 and 105. Instead, the axial movement may be limited by tapered walls having a greater diameter than an inside diameter of the bottom bracket 2. In this case, the adapters are removable by twisting a tool inserted between the tapered walls and end faces of the bottom bracket 2.

(3) In the foregoing embodiments, the crank shaft unit 1 or 101 and crank arms 501 and 502 are formed separately. However, the crank arms may be formed integral with the crank shaft 7 or 107. In this case, the crank shaft unit is inserted into the bottom bracket 2 as follows.

Where only one of the crank arms 501 and 502 is integrated with the crank shaft unit, the crank shaft unit is first inserted into the bottom bracket 2, and thereafter the other crank arm is secured, such as by screwing, to the crank shaft unit. Where both of the crank arms 501 and 502 are integrated with the crank shaft, a split bottom bracket is used which is hinged at one side thereof, for example. After placing the crank shaft unit in this bracket, the other free sides of the brackets are rigidly interconnected by bolts or the like.

(4) The bearing device is not limited to the ball bearings, but various other types of bearings may be employed.

(5) While, in the foregoing embodiments, two, right and left adapters are used, only one is adequate. In this case, the end of the crank shaft unit where the adapter is not provided has a threaded outer surface of the cylindrical member which is meshed with a thread groove formed in the inside wall of the bottom bracket.

(6) The adapters may be formed of an FRP or other hard plastics, an elastically deformable metal or resin, or various composite materials. Each adapter may be an assembly of plural parts.

(7) The adapters may include grooves for fitting seals therein for sealing between the adapters and the bosses of the crank arms.

What is claimed is:

1. An apparatus for rotatably mounting bicycle crank arms, said crank arms having respective bosses with inside walls, said apparatus comprising:
   a crank shaft unit including:
      a crank shaft having connecting projections formed at opposite ends thereof for engaging with the inside walls of the respective bosses of said crank arms,
      a cylindrical member surrounding said crank shaft said cylindrical member having inside walls, and
   adapter means for maintaining said crank shaft unit in position relative to said bottom bracket, said adapter means having inside walls;
   wherein at least part of said bosses of said crank arms extend into annular spaces formed between the inside walls of said adapter means and said crank shaft.

2. An apparatus as claimed in claim 1, wherein said adapter means includes a first adapter attached to one end of said bottom bracket, and a second adapter attached to the other end of said bottom bracket.

3. An apparatus as claimed in claim 2, wherein each of said first and second adapters has a cylindrical shape with a flange formed on an outward end thereof for contacting an end of said bottom bracket.

4. An apparatus as claimed in claim 2, wherein each of said first and second adapters has a cylindrical shape with a tapered outer wall.

5. An apparatus as claimed in claim 2, wherein each of said first and second adapters is inserted between an inside wall of said bottom bracket and an outside wall of said cylindrical member.

6. An apparatus as claimed in claim 5, wherein said first adapter has an inside wall fitting on the outside wall of said cylindrical member, and an outside wall screwed to the inside wall of said bottom bracket, and said second adapter has an inside wall splined to the outside wall of said cylindrical member, and an outside wall screwed to the inside wall of said bottom bracket.

7. An apparatus as claimed in claim 2, wherein said first adapter is inserted between an inside wall of said bottom bracket and an outside wall of said cylindrical member, and said second adapter is inserted between an inside wall of said cylindrical member and said crank shaft.

8. An apparatus as claimed in claim 7, wherein said first adapter has an inside wall fitting on the outside wall of said cylindrical member, and an outside wall screwed to the inside wall of said bottom bracket, said second adapter has an inside wall splined to the outside wall of said cylindrical member, and the outside wall of said cylindrical member is screwed to the inside wall of said bottom bracket.

9. An apparatus as claimed in claim 1, wherein said bearing means includes a first bearing unit and a second bearing unit spaced from each other axially of said crank shaft.

10. An apparatus as claimed in claim 9, wherein each of said first and second bearing units includes a recessed inner race formed on said crank shaft, a recessed outer race formed on said cylindrical member, and balls arranged between said inner race and said outer race.

11. An apparatus as claimed in claim 9, wherein said first bearing unit includes a recessed inner race formed on said crank shaft, a recessed outer race formed on said cylindrical member, and balls arranged between said inner race and said outer race; and said second bearing unit includes an inner race element screw-fed on said crank shaft, a recessed outer race formed on said cylindrical member, and balls arranged between said inner race element and said outer race; said cylindrical member defining an inspection and maintenance bore for allowing positional adjustment of said inner race element.

* * * * *